Sept. 1, 1964  S. F. CHAPPELL  3,146,923
MEASURED-DOSE SLIDE VALVE DISPENSER
Filed Oct. 9, 1963

INVENTOR.
STORY F. CHAPPELL
BY
Curtis, Morris & Safford
ATTORNEYS

United States Patent Office 3,146,923
Patented Sept. 1, 1964

3,146,923
MEASURED-DOSE SLIDE VALVE DISPENSER
Story F. Chappell, 9 Knoll St., Riverside, Conn.
Filed Oct. 9, 1963, Ser. No. 314,946
8 Claims. (Cl. 222—464)

This invention relates to a dispenser and in particular to measured-dose dispensers which are suitable for use with a container of thick or viscous liquid, such as a detergent, soap, and shampoo.

Detergents, soaps, and shampoos are now packed in containers which may readily be used with self-operating dispensers which provide a consistent (within tolerances acceptable to the trade) measured dose. However, as far as it is known, no adequate dispenser of this type is available which will meet the needs of these thick heavy liquids particularly to dispense a relatively large amount of liquid. The only known commercial self-operating dispensing devices for these containers are those which are primarily intended for use with thin watery type liquids such as liquors and hair tonic.

In order to use many detergents properly and economically, it is necessary that only a definite and measured amount of detergent be used in making each quantity of solution. Heretofore, to obtain a small amount the standard means of measuring the correct amount of liquid detergent has been to fill the closure cap of the container with detergent so that the cap serves as a measuring cup. Such a measuring operation is cumbersome and messy as well as being a nuisance to the user. To obtain larger amounts, it has been necessary to transfer the liquid to a separate measuring cup in order to measure the quantity desired.

Dispensers designed for use with thin and watery types of liquids usually have moving parts which are clogged or "frozen" by thick, heavy viscous liquids such as detergents. Such a dispenser with easily clogged moving parts would become tightly sealed by a dried or caked film of detergent if the dispenser is left unused for any extended period of time.

Dispensers designed for use primarily with thin and watery liquids are also intricate in design and fairly expensive to manufacture and are not usually designed for insertion into containers as part of an automatic factory loading operation.

Accordingly, it is an object of the present invention to provide a dispenser particular adapted for use with thick, viscous liquids such as detergents, shampoos, soaps, etc. It is another object to provide a dispenser which is of simple construction and inexpensive to manufacture. It is a further object to provide a dispenser which is adapted for installation into a container or can during a factory container filling operation using automatic machinery.

It is still another object of the present invention to provide a dispenser wherein the contact points between moving parts and stationary parts of the dispenser are at all times maintained in a leak-proof bath of the liquid thus preventing "freezing" or caking between uses. It is also a further object to provide a small, compact dispenser which gives a relatively large measured dose, with the flow of liquid being cut off with a minimum after-drip, as soon as the measured amount is delivered. Still another object is to provide a dispenser with a variable measured dose, which can be adjusted at the option of the user. Another object is to provide a measured-dose dispenser that can be modified to operate in either rigid-wall or flexible-wall containers.

In the accompanying drawings, preferred embodiments of the present invention are shown and these embodiments are described in detail in the specification. However, it is to be understood that the drawings and description are not intended to be either exhaustive or limiting of the present invention in improved dispensers, but on the contrary, are for the purpose of illustrating and describing the invention in order that others skilled in the art may fully understand the invention, its principles and the application thereof and that they may embody it and adapt it in numerous forms, each as may be best suited to the requirements of a particular dispenser and its intended usage.

Figure 1:
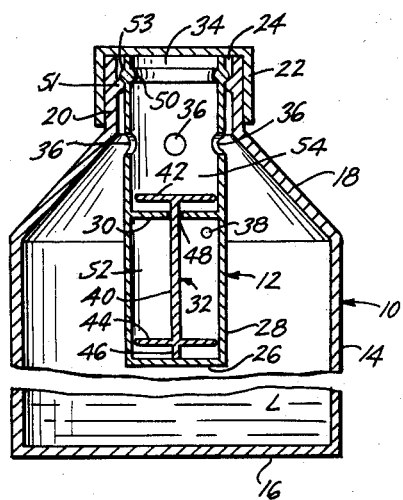
FIGURE 1 is a partially fragmentary sectional view of a dispenser for measuring liquids and a container for holding a supply of liquid.

Referring to the drawings, and to FIGURE 1 in particular, a hollow container 10 holding a liquid L is fitted with a dispenser 12. The container 10 has a substantially cylindrical sidewall 14, a bottom wall 16, a sloping upper wall 18 and a neck portion 20. A cap 22 or any other suitable closure is provided to close off the top opening 24 in the neck 20.

The dispenser 12 is inserted into the container 10 through the top opening 24 in the neck 20. The dispenser 12 is comprised of a bottom wall 26, a side wall 28, an intermediate transverse partition 30, and a slide valve 32. The dispenser 12 has a top opening 34. The dispenser side wall 28 has a plurality of inlet openings 36 above the partition 30 and a vent opening 38 below this partition.

The dispenser slide valve 32 comprises a central shaft 40, a top plate 42, a lower plate 44 and a standoff member 46. The top plate 42 is positioned above the partition 30 and the central shaft 40 is inserted through a central opening 48 in the partition 30, the shaft 40 being freely slidable through the opening 48. The standoff member 46 contacts the bottom wall 26 of the dispenser so that the lower plate 44 is spaced from the wall 26.

At the upper end of the dispenser 12 a valve stop 50 is provided to engage the top plate 42 of the slide valve 32. Advantageously, the valve stop 50 is spaced above the inlet openings 36 approximately the same distance that the partition 30 is spaced below these same openings.

To use the dispenser 12 and obtain a measured dose of the liquid L, the dispenser is inserted into the neck 20 of the container 10. In the illustrated embodiment of FIGURE 1 a shoulder 51 is provided on the inner surface of the neck 20 and this shoulder engages a protrusion 53 on the outer surface of the sidewall 28 of the dispenser 12. The shoulder 51 and the protrusion 53 cooperate to position the dispenser in the container. The dispenser 12 is secured to the container by any suitable means, such as force fit, screw threads or adhesives.

When the dispenser 12 is first inserted into the container 10, automatic loading of the dispenser will take place if the level of the liquid L is above the opening 38. Displaced air in the lower dispenser compartment 52 of the dispenser will escape through opening 48 in the partition 30.

If the liquid level in the container 10 is not high enough to fill compartment 52 through the opening 38, loading of the compartment is obtained in the following manner. The container 10 and dispenser 12 with cap 22 in place are inverted. When this is done the slide valve 32 will fall so that the top plate 42 contacts the valve stop 50, the valve stop 50 acting as a valve seat. Liquid L will then flow through the openings 36 and fill the upper dispenser compartment 54. When the container and dispenser are returned to their normal upright position, a consistent amount of liquid will flow from the upper compartment 54 through partition opening 48 and into the lower compartment 52 with the displaced air in compartment 52 passing through the vent opening 38. Thus, the lower compartment 52 is filled with liquid L up to the vent opening 38.

With the lower compartment 52 loaded, the dispenser is ready to discharge a measured dose of liquid from the container 10. When the container 10 is inverted with cap 22 removed, liquid will flow from the container through the dispenser openings 36 and out the top opening 34. At the same time the slide valve 32 will move by gravity towards the valve stop 50. However, since liquid is trapped in the lower compartment 52 the travel of the slide valve 32 is slowed by the drag of the lower plate 44 through the trapped liquid.

Advantageously, the slide valve shaft 40 is slidable through the opening 48 in the partition 30. The amount of clearance provided for shaft 40 in opening 48 helps to determine how fast the slide valve 32 will fall. In addition the rate of fall is determined by the viscosity of liquid L and the weight and size of the valve 32. When the valve weight and size and the liquid have been selected, the amount of liquid passing through the dispenser openings 36 and out the top opening 34 will be consistent on each inversion of the container and dispenser. The flow from the dispenser will be shut off when the top plate 42 has passed the openings 36 and become seated on the valve stop 50 which is shown as being continuous in FIGURE 1.

A small amount of liquid may be lost from the lower compartment 52 during the discharge operation. However, liquid trapped in the upper compartment 54 will replenish the lost liquid in the manner described hereinbefore for first filling the dispenser.

It is to be noted that the dispenser openings 36 are preferably adjacent to the juncture of the neck 20 and the upper wall 18 of the container 10. This positioning effectuates efficient use of substantially all of the liquid in the container.

In the embodiment of FIGURE 1, a consistent dose of liquid L is obtainable on each inversion of the dispenser and container combination. Sometimes, it may be desirable to reduce the dose. Accordingly, in the embodiment of FIGURE 2 a modified variable dosage dispenser is shown.

Figure 2:
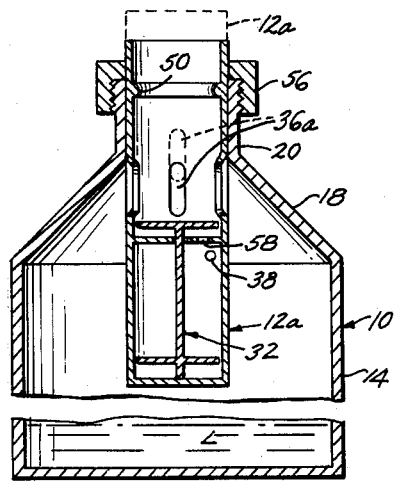
FIGURE 2 is a view similar to FIGURE 1 of a modified embodiment of the arrangement of FIGURE 1.

Referring to FIGURE 2, the dispenser 12a is inserted into the container 10 and positioned by means of a suitable support member 56. The support member is adapted to encircle the dispenser 12a and also to engage the neck 20 of the container 10. In this illustrated embodiment the inlet openings 36a in the dispenser are elongated and of a greater extent than openings 36 in the first illustrated embodiment. Also, in this second embodiment a small eccentrically positioned opening 58 is optionally provided to assist the emptying of the lower compartment when the central partition opening is reduced in size to provide minimum clearance of the shaft 40.

In the illustration in FIGURE 2, the dispenser 12a is force fitted into the container and the support 56 force fitted about the dispenser 12a. To reduce the extent of the openings 36a, the support 56 need only be repositioned in relation to the dispenser 12a so that the openings 36a are raised to the position shown by the broken lines. Since the dispenser is snugly fitted into the neck 20, the effective area of the openings 36a is reduced. Inasmuch as the size of openings 36a control the flow of liquid L, a reduction in area results in a reduction of flow.

Figure 3:
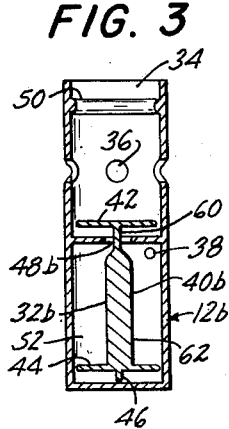
FIGURE 3 is a sectional view of another dispenser similar to the dispenser of FIGURE 1.

In FIGURE 3 another embodiment of a dispenser in accordance with the present invention is illustrated. This dispenser is adaptable for use with less viscous or thin liquids.

The dispenser is similar to the dispenser 12 of FIGURE 1 except that the central shaft 40b of the slide valve 32b is of a different construction. The upper portion 60 of shaft 40b is of small cross-section and the partition opening 48b is much greater than required to accommodate portion 60. However, the greater extent of shaft 40b, the lower portion 62, has a large cross-section which slidably but snugly engages the enlarged opening 48b.

In operation, valve 32b quickly falls the extent of portion 60, then the fall is slowed and the liquid trapped in the lower compartment 52 cannot escape past the snug fitting portion 62. The resulting measured dose passing through openings 36 and 34 is similar to that described in relation to the embodiment of FIGURE 1.

Figure 5:
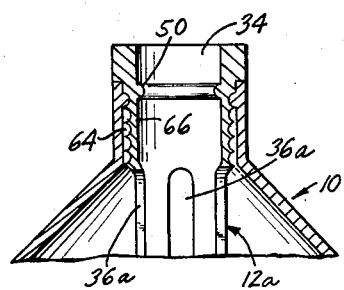
FIGURE 5 is a fragmentary sectional view of a dispenser and container similar to that of FIGURE 2 and showing a modified securing means.

In FIGURE 5, still another embodiment of dispenser is illustrated. In this embodiment the construction is generally somewhat like that in FIGURE 2. While in this construction the dispenser is the same, but the means of setting the dispenser 12a in the neck 20 of the container 10 is modified. A series of ridges 64 are provided within the neck 20 and these mate with grooves 66 on the dispenser 12a. By matching the selected ridges and grooves the height of the dispenser 12a may be varied to open or close openings 36 and thus change the amount of pour.

The preceding embodiments of dispensers are advantageously preferably used with substantially rigid sidewall containers. However, the present invention is also applicable to flexible or semi-rigid containers.

Figure 6:
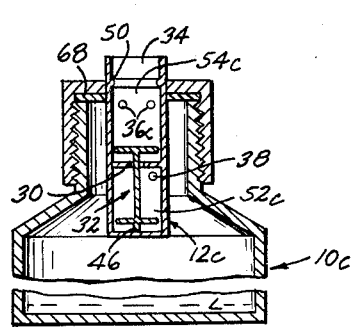
FIGURE 6 is a partially fragmentary and sectional view of another dispenser and container arrangement.

In FIGURE 6 a dispenser 12c particularly adaptable for use with a flexible or semi-rigid side wall container 10c is shown. In this embodiment the dispenser 12c advantageously has a substantially smaller transverse cross-section than the neck 20 of the container 10c. The dispenser 12c is constructed similar to dispenser 12 except that the openings 36 of dispenser 12 are replaced by openings 36c. Openings 36c are advantageously located near to the pour opening 34 while still maintaining communication with the interior of container 10c.

To position the dispenser 12c an integral flange 68 is provided and this sits on top of the neck 20.

To load the dispenser 12c the flexible wall container 10c is squeezed with a constant pressure until liquid is forced into the dispenser 12c through the openings 36c. The pressure is maintained until the upper compartment 54c is filled. The pressure is then released, the liquid drains into the lower compartment 52c and the loaded dispenser is ready for use.

The loaded dispenser 12c and container 10c are then inverted (with covering cap 24 or a similar cover removed). By squeezing the container 10c a flow of liquid L will pass from the container through the dispenser openings 36c and out the top opening 34. This will continue until the top plate of slide valve 32 is seated on the valve stop or seat 50 and the flow is cut off. When the squeeze pressure is released and the container 10c returned to an upright position, the valve 32 will return to its at rest position and any small loss of trapped liquid from the lower compartment 52c will be replaced. The container is now ready to dispense another and consistent dose.

In this embodiment of the present invention the amount of liquid remaining in the container 10a has no appreciable effect on the operation of the dispenser. The squeeze pressure is the predominant factor and that together with the fall of the valve 32 determines the amount of each dose. Of course, the size of the opening 36c is also of consequence. Accordingly, if desired the dose may be varied by providing an encircling sleeve or other device which advantageously may be preset to determine the extent of the opening 36c.

Figure 4:
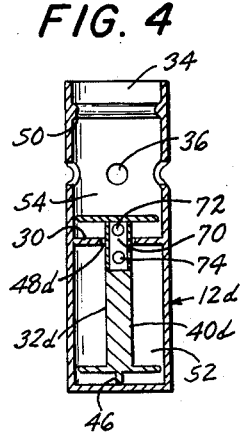
FIGURE 4 is a sectional view of still another dispenser similar to the dispenser of FIGURE 1.

In FIGURE 4 still another embodiment of dispenser is shown with a variation of the slide valve 32d. The dispenser 12d is substantially similar to dispenser 12 of FIGURE 1. However, in FIGURE 4 the partition 30 has an enlarged central opening 48d. The slide valve central shaft 40d has a hollow upper portion 70. This hollow portion 70 has an upper opening 72 which is normally above the partition 30, and a lower opening 74 which is below the partition 30. This hollow portion 70 acts as a conduit to convey liquid L from upper compartment 54 to the lower compartment 52. This dispenser 12d functions substantially the same as dispenser 12 except that the hollow portion 70 and the openings 72 and 74 facilitate transfer of liquid from compartment 54 to lower compartment 52. This permits quicker reuse of the dispenser in the event the compartment 52 must be reloaded.

From the foregoing discussion and drawings the advantages and objects set forth before, as well as others which are obvious from the description, are accomplished by dispensers and containers coming within the scope of the following claims.

I claim:

1. A measured liquid dose dispenser for use in a container having an elongated neck portion and a top opening in said neck, said dispenser inserted into the top opening and the neck of said container and comprising a side wall, bottom wall and an open top, an intermediate partition dividing the dispenser into an upper and a lower compartment, a slide valve having a central shaft and upper and lower plates, the central shaft being slidably moveable through an opening in said partition, the upper plate being positioned within the upper compartment and the lower plate within the lower compartment, a valve stop seat near the open top of the dispenser and adapted to engage the top plate when the slide valve is inverted, at least one opening in the dispenser side wall, said opening communicating between the interior of the container and the upper compartment whereby liquid within the container may flow from the container to the upper compartment and out the top opening when the container and dispenser are inverted, said flow continuing until the top plate is seated on the valve stop seat.

2. A measured liquid dose dispenser as defined in claim 1 wherein the sidewall opening is elongated and said dispenser is adapted to be positioned snugly within the neck of the container whereby said elongated opening may be reduced in size by adjusting its position relative to the neck of the container.

3. A measured liquid dose dispenser as defined in claim 1 wherein a vent opening is provided in the dispenser sidewall near the intermediate partition and in communicaiton with the lower dispenser compartment.

4. A measured liquid dose dispenser as defined in claim 1, wherein the opening in the dispenser side wall is positioned about midway between the valve stop seat and the intermeidate partition.

5. A measured liquid dose dispenser as defined in claim 1, wherein the central shaft of the slide valve is of lesser cross sectional extent near the top plate than at the lower plate, said greater cross-sectional extent of said shaft snugly slideable through the opening in said intermediate partition.

6. A measured liquid dose dispenser as defined in claim 1, wherein the central shaft of the slide valve has a hollow portion near the top plate and further including an opening in said hollow portion above the partition and a second opening below the partition when said dispenser is in an upright at rest position.

7. A measured liquid dose dispenser as defined in claim 1 and particularly adaptable for use with flexible wall containers, wherein said dispenser has a cross-sectional extent less than the cross-sectional opening of the neck of the container.

8. A measured liquid dose dispenser as defined in claim 1, and further including a stand-off member attached to the slide valve whereby the bottom plate is prevented from contacting the bottom wall of the dispenser when the dispenser is in an upright at rest position.

References Cited in the file of this patent

UNITED STATES PATENTS

| | | |
|---|---|---|
| 1,279,014 | Schimel | Sept. 17, 1918 |
| 2,038,418 | Conner | Apr. 21, 1936 |
| 3,057,500 | Fortuna et al. | Oct. 9, 1962 |

FOREIGN PATENTS

| | | |
|---|---|---|
| 477,922 | Great Britain | Jan. 10, 1938 |
| 868,409 | Germany | Feb. 26, 1953 |